(12) United States Patent
Hashimoto et al.

(10) Patent No.: US 7,523,360 B2
(45) Date of Patent: Apr. 21, 2009

(54) ABNORMALITY ALARM DEVICE AND ABNORMALITY ALARM METHOD

(75) Inventors: Hideyuki Hashimoto, Toyokawa (JP); Mie Kawabata, Toyokawa (JP); Toshihisa Motosugi, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 278 days.

(21) Appl. No.: 10/292,602

(22) Filed: Nov. 13, 2002

(65) Prior Publication Data

US 2003/0093710 A1 May 15, 2003

(30) Foreign Application Priority Data

Nov. 15, 2001 (JP) ............... 2001-350678

(51) Int. Cl.
*G06F 11/00* (2006.01)
(52) U.S. Cl. .......................... 714/57; 714/48
(58) Field of Classification Search .................. 714/57, 714/46, 48; 399/8
See application file for complete search history.

(56) References Cited

U.S. PATENT DOCUMENTS

| 5,084,875 | A | * | 1/1992 | Weinberger et al. ............ 714/46 |
| 5,696,486 | A | * | 12/1997 | Poliquin et al. ............. 340/506 |
| 5,764,886 | A | * | 6/1998 | Danielson et al. ............. 714/47 |
| 5,970,149 | A | * | 10/1999 | Johnson ........................ 714/46 |
| 6,347,384 | B1 | * | 2/2002 | Satomi et al. ................. 714/57 |
| 6,353,899 | B1 | * | 3/2002 | Martin et al. ................. 714/57 |
| 6,477,667 | B1 | * | 11/2002 | Levi et al. ...................... 714/57 |
| 6,567,937 | B1 | * | 5/2003 | Flores et al. ................... 714/46 |
| 6,622,266 | B1 | * | 9/2003 | Goddard et al. ............... 714/44 |
| 6,671,824 | B1 | * | 12/2003 | Hyland et al. ................. 714/26 |
| 6,772,376 | B1 | * | 8/2004 | Merkin et al. ................. 714/48 |
| 2001/0013053 | A1 | * | 8/2001 | Yamazaki ................... 709/203 |

| 2001/0013109 | A1 | | 8/2001 | Daimon et al. |
| 2002/0087680 | A1 | * | 7/2002 | Cerami et al. ............... 709/224 |

(Continued)

FOREIGN PATENT DOCUMENTS

JP          06-320845 A          11/1994

(Continued)

OTHER PUBLICATIONS

NB80013496, Automatic Recovery Routine In Case of Service Failure By A Controller On A Controlled Printer, IBM Techincal Disclosure Bulletin, Jan. 1980, vol. 22, Issue 8B, p. 3496, Jan. 1, 1980.*

(Continued)

*Primary Examiner*—Joshua A Lohn
(74) *Attorney, Agent, or Firm*—Morrison & Foerster LLP

(57) ABSTRACT

An abnormality that has occurred during execution of a job by an image forming apparatus is detected by a detecting means, an attribute of the sender of the job with which the abnormality occurred is identified by an identifying means, and recipients for abnormality alarm information are determined by an alarm information recipient determining means based on the identification result. Consequently, when an abnormality has occurred during execution of a job by the image forming apparatus, even if the user who sent the job is not able to perform the operation required to eliminate the abnormality, swift elimination of the abnormality can be expected by transmitting abnormality alarm information to persons who are near the image forming apparatus, for example.

18 Claims, 6 Drawing Sheets

U.S. PATENT DOCUMENTS

2003/0101385 A1* 5/2003 Lee .................. 714/48
2004/0030762 A1* 2/2004 Silverthorne et al. ........ 709/223

FOREIGN PATENT DOCUMENTS

| | | |
|---|---|---|
| JP | 07-287679 | 10/1995 |
| JP | 8204937 | 8/1996 |
| JP | 08-274927 | 10/1996 |
| JP | 09-305334 | 11/1997 |
| JP | 10-024644 | 1/1998 |
| JP | 11-327854 | 11/1999 |
| JP | 11328563 | 11/1999 |
| JP | 2000-149174 | 5/2000 |
| JP | 2000205890 | 7/2000 |
| JP | 2000-284920 | 10/2000 |

OTHER PUBLICATIONS

Japanese Office Action dated Jan. 23, 2007 directed to counterpart foreign application.

Japanese Office Action dated Jun. 12, 2007, directed to counterpart Japanese Application No. 2001-350678 (4 pages).

* cited by examiner

| priority table for the transmission of alarm information ||
|---|---|
| ranking | alarm information recipient |
| 1 | 3B |
| 2 | 3F |
| 3 | 3D |
| 4 | 3A |
| 5 | 3H |
| 6 | 3G |
| 7 | 3C |
| 8 | 3E |

ABNORMALITY ALARM DEVICE AND ABNORMALITY ALARM METHOD

CROSS-REFERENCE TO RELATED APPLICATIONS

This application is based on application No. 2001-350678 filed in Japan, the contents of which is hereby incorporated by reference.

BACKGROUND OF THE INVENTION

1. Field of the Invention

The present invention relates to an abnormality alarm system, an abnormality alarm device and an abnormality alarm method that, when an abnormality such as an error or other type of problem has occurred during execution of a job sent to an image forming apparatus such as a printer, copying machine or other type of job execution apparatus, detect the abnormality and provide an alarm in regard thereto.

2. Description of the Related Art

In various types of information processing systems, when an abnormality occurs in a terminal or the like, information regarding such abnormality is immediately supplied to the host or the management center so that necessary measures can be taken.

In the conventional art, Japanese Laid-Open Patent Application 2000-205890, for example, discloses a construction in which the voice of an insurance policyholder carrying a portable terminal with GPS capability, which is emitted during an emergency or accident, is detected, the location of the accident is identified on a map based on the detected voice, and the call center of the insurance company is notified, whereby speedy support for the policyholder is provided.

Japanese Laid-Open Patent Application 2000-149174 discloses a technology that detects the occurrence of an abnormality in an information processing system, identifies the apparatus in which the abnormality occurred based on the situation and timing of the occurrence, and sends the optimal representative notice of the abnormality in accordance with a priority ranking.

Furthermore, Japanese Laid-Open Patent Application H11-328563 discloses a technology using which the map-based location of a vehicle involved in an accident is identified at an emergency center based on location information provided from the emergency alarm device of such vehicle, emergency contact persons are sought and displayed from the database, and mobilization of emergency vehicles is requested, enabling the emergency vehicles to arrive at the accident scene more quickly.

In addition, Japanese Laid-Open Patent Application H8-204937 discloses a technology that provides an alarm regarding a prescribed situation, such as an error that has occurred in a facsimile machine, to another information apparatus such as a personal computer, which then provides instructions for the correction of the abnormality to the information apparatus and the error is corrected based on such instructions.

OBJECT AND SUMMARY

Incidentally, it is now common for a job execution apparatus such as an image forming apparatus and multiple user terminals to be connected over a network such that jobs sent from the terminals are executed by the job execution apparatus. In such a job execution system, when an abnormality such as an error or other type of problem has occurred in the job execution apparatus during execution of a job, the terminal or the like need to be notified of such occurrence so that the abnormality can be eliminated.

It is possible in this case to send the abnormality alarm information to a terminal or the like that is located relatively close to the job execution apparatus based on the technologies of the conventional art described above.

However, if the user receiving the alarm information cannot operate the job execution apparatus for some reason, the error or other type of problem cannot be eliminated.

For example, there has been increased demand in recent years for the design of products, etc. that enables as many people as possible, including beginners and disabled persons, to use the product (universal design). A user that uses a job execution apparatus created based on such principle is often a beginner or a disabled person rather an experienced user with no disability. It is quite likely in this case that even if the user receives abnormality alarm information, the user cannot perform the operation required to eliminate the abnormality.

In view of the foregoing, an object of the present invention is to provide an abnormality alarm system, an abnormality alarm device and an abnormality alarm method capable of ensuring early and reliable elimination of abnormalities from a job execution apparatus in which an abnormality such as an error or other type of problem has occurred.

The above object is attained by an abnormality alarm system including detecting means that detects an abnormality in a job execution apparatus that executes jobs received from senders, identifying means that identifies an attribute of the sender of the job being executed when the abnormality occurred, alarm information recipient determining means that determines recipients for abnormality alarm information in accordance with the identification result obtained by the identifying means, and transmitting means that transmits the abnormality alarm information to the recipients thus determined.

In this abnormality alarm system, when an abnormality such as an error or other type of problem that has occurred in the job execution apparatus comprising an image forming apparatus or the like is detected by the detecting means during execution of a job, an attribute of the sender of the job being executed when the abnormality occurred is identified by the identifying means, and based on the identification result, recipients who are to receive abnormality alarm information are determined by the alarm information recipient determining means.

In other words, where an abnormality has occurred during execution of a job by the job execution apparatus, an attribute of the job sender, such as the low operation skill level of the sending user, is identified, and if the operation skill level is low and it is not possible for the user to perform the operation required to eliminate the abnormality, the abnormality alarm information is transmitted to persons that are near the job execution apparatus, for example, in order to facilitate the elimination of the abnormality.

In this abnormality alarm system, the attribute of the job sender preferably relates to whether or not the user is a user capable of performing the operation required to eliminate the abnormality. Consequently, it can be accurately determined whether or not the user who sent the job can perform the operation required to eliminate the abnormality. Users capable of performing operations to eliminate abnormalities are unimpaired experienced users while users not capable of such operations includes beginners, disabled users, children and elderly users. For example, where a beginner or disabled person is using an apparatus created based on the principle of universal design, the abnormality alarm information is provided to persons located near the job execution apparatus instead of to the user, asking such persons to perform the operation required to eliminate the abnormality.

In the abnormality alarm system described above, the alarm information recipients may be portable terminals, cellular phones or non-portable terminals such as desktop personal computers. If such a construction is adopted, abnormality alarm information can be swiftly provided based on the attribute identification result. E-mail (including instant messaging) can be used with alarm information recipients comprising portable terminals, cellular phones or non-portable terminals such as personal computers, and in the case of cellular phones, alarm information may be provided through a telephone call.

Furthermore, in this abnormality alarm system, the determination of alarm information recipients by the alarm information recipient determining means may be performed based on information regarding the movement of the portable terminals or cellular phones. In this case, alarm information can be provided to the owners of portable terminals or cellular phones in the vicinity of the job execution apparatus in which the abnormality occurred in the order of proximity to the job execution apparatus.

Moreover, in the abnormality alarm system, the determination of alarm information recipients by the alarm information recipient determining means may be performed based on the status of operation of the non-portable terminals. In this case, the abnormality alarm information can be given to terminals that are operating.

In addition, in this abnormality alarm system, the determination of alarm information recipients by the alarm information recipient determining means may be performed in the following manner: Possible alarm information recipients are prioritized in advance such that person A is designated as the first choice recipient, person B is designated as the second choice recipient and so on, the recipients and their priority ranking are stored in memory, detection is performed regarding the status of operation of the portable terminals of these candidates and regarding whether or not the portable terminals are within a prescribed distance range from the job execution apparatus, and alarm information recipients are determined based on the combination of such information.

In this abnormality alarm system, the alarm information recipient determining means may also determine the senders of jobs that were sent to the job execution apparatus before the job with which the abnormality occurred as the alarm information recipients. In this case, the system can have users who are likely to have output materials still remaining on the job execution apparatus after the completion of the execution of their respective jobs perform the operation required to eliminate the abnormality at the same time as they come to the job execution apparatus in order to retrieve the output materials.

The object described above is also attained by an abnormality alarm device including a detection unit that detects an abnormality in a job execution apparatus that executes jobs received from senders, an identification unit that identifies an attribute of the sender of the job being executed when the abnormality occurred, an alarm information recipient determination unit that determines recipients of abnormality alarm information in accordance with the identification result obtained by the identification unit, and a transmission unit that transmits abnormality alarm information to the recipients thus determined.

In this abnormality alarm device, where an abnormality has occurred during execution of a job by the job execution apparatus, an attribute of the job sender, such as whether or not the sender's operation skill level is low, is identified, and if the operation skill level is low and it is not possible for the user to perform the operation required to eliminate the abnormality, the abnormality alarm information is sent to other persons who are close to the job execution apparatus, for example, in order to facilitate the elimination of the abnormality.

In this abnormality alarm device as well, the attribute of the job sender preferably relates to whether or not the user is a user capable of performing the operation required to eliminate the abnormality. Consequently, it can be accurately determined whether or not the user, who is the job sender, can perform the operation required to eliminate the abnormality.

The object described above is also attained by an abnormality alarm method that includes a step of detecting an abnormality in a job execution apparatus that executes jobs received from senders, a step of identifying an attribute of the sender of the job being executed when the abnormality occurred, a step of determining recipients for abnormality alarm information in accordance with the identification result, and a step of transmitting abnormality alarm information to the recipients thus determined.

In this abnormality alarm method, where an abnormality has occurred during execution of a job by the job execution apparatus, an attribute of the job sender, such as whether or not the sender's operation skill level is low, is identified, and if the sender's operation skill level is low and it is not possible for the sender to perform the operation required to eliminate the abnormality, the abnormality alarm information is sent to others who are close to the job execution apparatus, for example, in order to facilitate the elimination of the abnormality.

The above object is also attained by an image forming apparatus that performs printing based on print data received from an external apparatus such as a personal computer or a facsimile machine, including a printing unit that receives print data sent from a sender and prints such data on a recording medium, a detection sensor that detects abnormalities in the printing unit, a controller that identifies an attribute of the sender of the print data regarding which an abnormality occurred and determines based on the identification result recipients for the transmission of abnormality alarm information, and a transmission unit that transmits the abnormality alarm information to the recipients thus determined.

In this image forming apparatus, when an abnormality occurs during an printing operation, an attribute of the job sender, such as whether or not the sender's operation skill level is low, or whether or not he is capable of eliminating the abnormality promptly, is identified, and if the user is not capable of performing the operation required to eliminate the abnormality or would need time to eliminate the abnormality, the abnormality alarm information is sent to others who are close to the job execution apparatus, for example, in order to facilitate the elimination of the abnormality.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

An embodiment of the present invention is described below with reference to the drawings.

Figure 1:
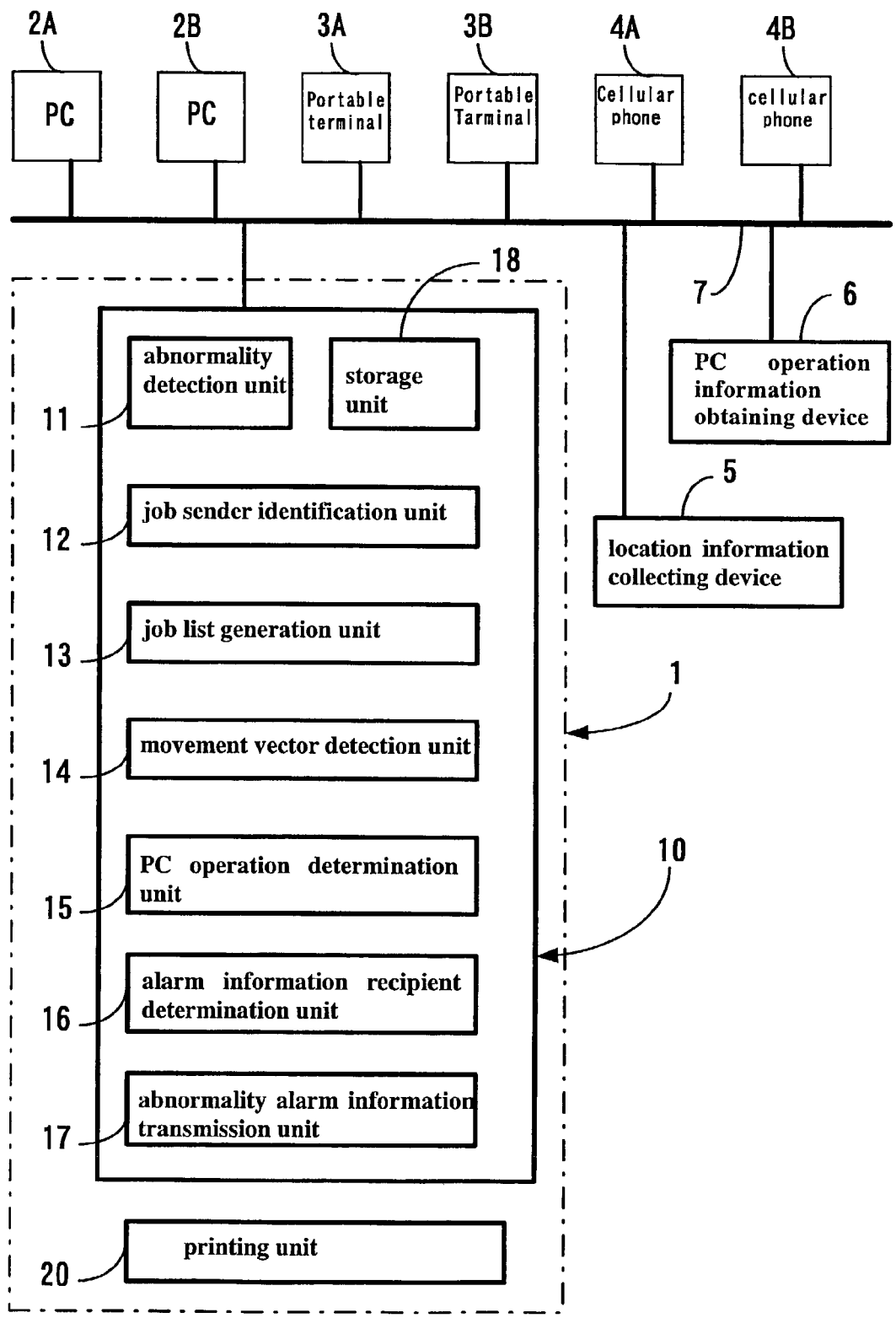
FIG. 1 is a block diagram showing an abnormality alarm system pertaining to one embodiment of the present invention.

FIG. 1 is a block diagram showing an abnormality alarm system pertaining to one embodiment of the present invention.

With reference to FIG. 1, in this abnormality alarm system, an image forming apparatus 1, which comprises a job execution apparatus, non-portable personal computers (hereinafter 'PCs') 2A, 2B, etc. that send jobs to the image forming apparatus 1, portable terminals 3A, 3B, etc. and by which users that share the image forming apparatus 1 send jobs to the image forming apparatus 1, cellular phones 4A, 4B, etc., a location information collecting device 5, and a PC operation information obtaining device 6 are connected to a cable or wireless network 7.

The image forming apparatus 1 comprises a printer in this embodiment, but may comprise a copying machine or a facsimile machine.

This image forming apparatus 1 has a printing unit 20 that serves as a printing apparatus that has printing functions and the like, and as an abnormality alarm device 10. As a general function, the printing unit 20 has a function by which it receives print data from an external apparatus such as a PC and prints the data on a recording medium using the public-domain electrophotograpic method, and the printing operation is monitored by an abnormality detection unit 11 described below. The abnormality alarm device 10 includes an abnormality detection unit 11, a job sender identification unit 12, a job list generation unit 13, a movement vector detection unit 14, a PC operation determination unit 15, an alarm information recipient determination unit 16, an abnormality alarm information transmission unit 17 and a storage unit 18 comprising a user database ('DB') or the like.

The abnormality detection unit 11 detects abnormalities such as errors and other types of problems that occur during execution of a job by the image forming apparatus 1, and the job sender identification unit 12 identifies the apparatus from which the job was sent (i.e., the sender). The job list generation unit 13 stores the status and execution schedule for jobs received by the image forming apparatus 1.

The movement vector detection unit 14 calculates the movement vectors of the portable terminals 3A, 3B, etc. and cellular phones 4A, 4B, etc. that are moving near the image forming apparatus 1 in which an abnormality has occurred, i.e., the direction and amount of movement of each apparatus.

The PC operation determination unit 15 determines whether or not an operation is being performed by a user on the PC 2A, 2B, etc. near the abnormally functioning image forming apparatus 1, or in other words, whether or not the PC 2A, 2B, etc. is operating.

The alarm information recipient determination unit 16 has a function to determine, when an abnormality has occurred in the image forming apparatus 1, recipients to which abnormality alarm information should be sent, and the abnormality alarm information transmission unit 17 has a transmission function to transmit the abnormality alarm information to the recipients determined by the alarm information recipient determination unit 16.

The storage unit 18 stores the names of users who send jobs to the image forming apparatus 1, and information regarding the operation skill level of the users, which constitutes user attribute information, in the form of a database. The information regarding the users' operation skill levels comprises, more specifically, information as to whether or not a particular user, who is a job sender, is capable of performing the operations required to eliminate abnormalities that occur in the image forming apparatus 1. In other words, it comprises information by which to identify whether or not the user is a unimpaired, experienced user or a beginner, disabled person, child or elderly person who is not capable of performing such operations.

The abnormality alarm device 10 is not limited to the built-in implementation in which the device 10 is included in the image forming apparatus 1, and may be separate from the image forming apparatus 1 and comprise a component of a server connected to the network 7, for example.

The abnormality detection unit 11, the job sender identification unit 12, the job list generation unit 13, the movement vector detection unit 14, the PC operation determination unit 15, the alarm information recipient determination unit 16, the abnormality alarm information transmission unit 17 and the storage unit 18, which are constituent elements of the abnormality alarm device 10, may also be located separately from the image forming apparatus 1.

The PCs 2A, 2B, etc. function as non-portable terminals, and some or all of the PCs are designed based on the universal design principle.

Incidentally, 'universal design' is based on a design philosophy that goes beyond barrier-free design, as commonly known, which is aimed at a specific group of users, and refers more broadly to designs that are applied in various products, facilities, city spaces, services and systems for easy use by various people regardless of the abilities, age, sex or nationality of the user. Accordingly, the PCs 2A, 2B, etc. designed based on the universal design principle are designed not only for unimpaired experienced users (general users) but also for beginners, disabled people, children, elderly people, etc.

The portable terminals 3A, 3B, etc. comprise PDAs (personal digital assistants), hand-held computers or the like.

The location information collecting device 5 collects information regarding the current location of the portable terminals 3A, 3B, etc. and cellular phones 4A, 4B, etc., and transmits such information to the abnormality alarm device 10 using a wireless communication method, for example. This location information collecting device 5 may be included in the abnormality alarm device 10 within the image forming apparatus 1.

The PC operation information obtaining device 6 obtains information regarding any operation performed on the PCs 2A, 2B, etc., and transmits the obtained information to the abnormality alarm device 10 over a network 7. Specifically, the PC operation information obtaining device 6 obtains information regarding the operation status of the PCs 2A, 2B, etc. through regular communication therewith or via transmission of information therefrom each time an operation is performed thereon. Such operation information may be obtained based on the existence of information regarding data transmission or receipt to or from the memory units (not shown) included in the PCs 2A, 2B, etc., or information regarding power consumption by the PCs 2A, 2B, etc.

The PC operation information obtaining device 6 may also be included in the printer 1, i.e., within the abnormality alarm device 10, for example.

In the abnormality alarm system having the construction shown in FIG. 1, when users send jobs to the image forming apparatus 1 using the PCs 2A, 2B, etc., the image forming apparatus 1 receives and processes them for printing in the order of receipt.

Where an abnormality such as an error or other type of problem occurs in the image forming apparatus 1 during execution of a job, the abnormality is detected by the abnormality detection unit 11, and the operation skill level, which is an attribute of the sender corresponding to the job being executed at the time the abnormality occurred, is identified by the job sender identification unit 12. Specifically, it is indicated whether or not the user is an non-disabled, experienced user who has an operation skill level that enables him to operate the image forming apparatus 1 to eliminate the abnormality, or a beginner, disabled person, child or elderly person with an operation skill level that does not enable him to perform such operation.

Where the attribute information regarding the job sender indicates that the user is a non-disabled, experienced user, because such a user is deemed to be capable of eliminating the error or other type of problem himself when the abnormality occurs, such a user can be left alone. In contrast, where the attribute indicates that the user is a beginner, disabled person, child or elderly person, because the user is deemed incapable of eliminating the error or other type of problem himself, the owner of portable terminal that is located closest to the abnormality-experiencing image forming apparatus 1 is selected on behalf of the user, and abnormality alarm information is sent to such owner. Consequently, processing to eliminate the abnormality can be performed swiftly, such that the wait by other users who plan to use the image forming apparatus 1 can be reduced.

The abnormality alarm information transmission routine will now be described with reference to the flow chart of FIG. 2.

First, in S101, where an abnormality has occurred in the image forming apparatus 1 executing a job, the sender identification unit 12 identifies the sender of the job being executed, and the operation skill level of such user (attribute information) is obtained based on the identification code from the database.

The database regarding senders is stored in the storage unit 18 of the printer 1, but may be stored in the network 7. Alternatively, the communication protocol may be set such that the attribute information for the sender, i.e., information indicating whether the user is capable of performing normal operation of the image forming apparatus or is a beginner or elderly user with regard to such operation, is sent together with a sender identification code before the job is executed.

In S102, the alarm information recipient determination unit 16 determines whether or not the operation skill level of the sender of the job is lower than a prescribed value (level). This operation skill level can be identified, for example, by setting an identification code '1' for non-disabled, experienced users and an identification code '0' for beginners, elderly users, etc., or by using graduating identification codes such that the users are labeled as 'A', 'B', 'C' users or the like depending on their operation skill level.

Where the operation skill level of the sender is lower than a prescribed value (determination in S102 results in YES), an alarm information recipient determination routine is performed in S103, in which recipients for abnormality alarm information are sought and determined, and the sequence advances to S104. Where the operation skill level of the job sender equals or exceeds the prescribed value (determination in S102 results in NO), the abnormality alarm information is not change to any PC 2A, 2B, etc., portable terminal 3A, 3B, etc., or cellular phone 4A, 4B, etc. other than the apparatus from which the job was received.

In S104, the abnormality alarm information transmission unit 17 sends the abnormality alarm information in accordance with the result of abnormality alarm information recipient determination or the sender of the job.

The alarm information recipient determination routine (S103) will now be described with reference to the flow chart of FIG. 3.

Where an abnormality occurs in the image forming apparatus 1 that is executing a job, location information regarding the image forming apparatus 1 is obtained in S201. The location information regarding the image forming apparatus 1 is stored in the image forming apparatus 1 or in the network 7.

Subsequently in S202, location information regarding the portable terminals 3A, 3B, etc. or cellular phones 4A, 4B, etc. that are moving near the abnormality-experiencing image forming apparatus 1 is obtained. Specifically, based on the information sent from the location information collecting device 5 that obtained location information regarding each device, the abnormality alarm device 10 obtains the location information. The location information thus obtained is then sent to the movement vector detection unit 14.

In S203, the movement vector detection unit 14 calculates the movement vectors of the portable terminals 3A, 3B, etc. or cellular phones 4A, 4B, etc., for which location information has been received, i.e., the direction and amount of movement of each such device.

In S204, the alarm information recipient determination unit 16 prioritizes the portable terminals 3A, 3B, etc. or cellular phones 4A, 4B, etc. located near the abnormality-experiencing image forming apparatus 1 based on the movement vectors thus calculated. In S205, abnormality alarm information is determined to the portable terminals 3A, 3B, etc. or cellular phone 4A, 4B, etc. having a high priority level in accordance with the prioritization result and the main routine is returned to.

In this example, error information having the same content is transmitted regardless of the priority level of each device, but the information content may be changed depending on the priority level.

Figures 4, 5:
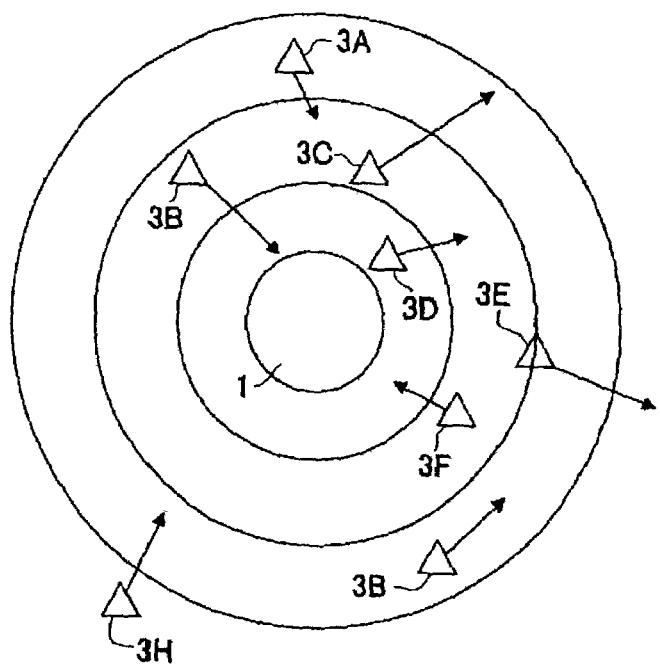
FIG. 4 is a drawing to explain an example of the method to determine the priority order of recipients in the abnormality alarm system.
FIG. 5 is a table showing an example of a recipient priority order determined according to the alarm information recipient priority order process.

FIGS. 4 and 5 are drawings to explain one example of the alarm information recipient priority determination method.

With reference to FIGS. 4 and 5, the location information collecting device 5 collects the location information regarding the portable terminals 3A, 3B, etc. that are moving nearer to the abnormality-experiencing image forming apparatus 1 and sends this information to the movement vector detection unit 14. Consequently, these devices are prioritized for the transmission of alarm information in accordance with the amount of time needed for them to reach the image forming apparatus 1.

Focusing on the portable terminal 3D shown in FIG. 4, for example, while it is located closer to the image forming apparatus 1 than the portable terminal 3B at a given point in time, because the movement vector of the portable terminal 3D indicates that it is moving away from the image forming apparatus 1, the priority level for the portable terminal 3D is determined to be lower than that for the portable terminal 3B, as shown in the table of FIG. 5. The same principle applies with regard to the cellular phones 4A, 4B, etc. A combined priority ranking may be determined for the portable terminals 3A, 3B, etc. and the cellular phones 4A, 4B, etc.

Because the alarm information is transmitted to the portable terminals 3A, 3B, etc. near the abnormality-experiencing image forming apparatus 1 in the order of distance therefrom, it becomes more likely that the abnormality will be eliminated swiftly.

An example in which two-dimensional movement vectors are calculated with regard to the portable terminals 3A, 3B, etc. or cellular phones 4A, 4B, etc. was shown in this embodiment, but considering a situation in which the portable terminals 3A, 3B, etc. and cellular phones 4A, 4B, etc. may exist on different floor levels in a multi-story structure, three-dimensional movement vectors that include the vertical direction may be calculated.

Another example of the alarm information recipient determination routine (S103) will now be described with reference to the flow chart of FIG. 6.

Where an abnormality has occurred in the image forming apparatus 1 during execution of a job, the location information regarding that image forming apparatus 1, which is stored therein or in the network 7, is obtained in S301, and the job list of the abnormality-experiencing image forming apparatus 1 is obtained in S302. The job list is generated by the job list generation unit 13 and is stored in the image forming apparatus 1, but it may be stored outside the apparatus as well.

In S303, the PC operation information obtaining device 6 obtains information regarding the operation of the PC 2A, 2B, etc. near the abnormality-experiencing image forming apparatus 1, and in S304, the PC operation determination unit 15 determines whether or not the PC 2A, 2B, etc. is operating normally.

In S305, abnormality alarm information is determined to the operating PC 2A, 2B, etc. among the senders found in the job list, and the main routine is returned.

Figure 7:
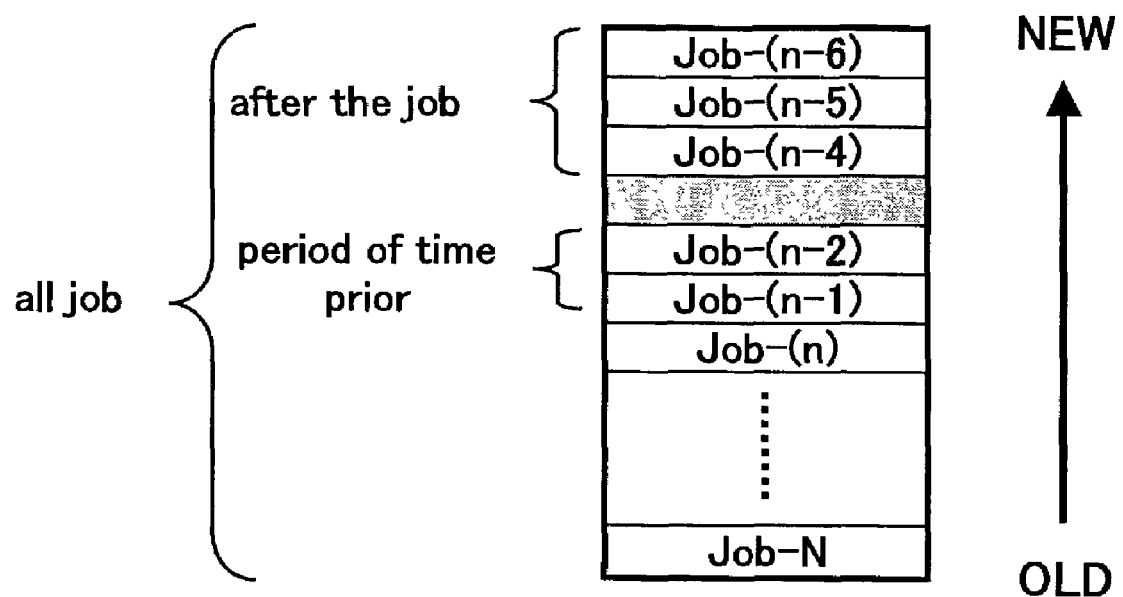
FIG. 7 is a drawing to explain an example of the alarm information recipient determination method that is based on job list information.

FIG. 7 is a drawing to explain one example of the alarm information recipient determination method based on the job list.

With reference to FIG. 7, abnormality alarm information recipients are determined from among operating PCs 2A, 2B, etc. based on the job list information. In this case, the abnormality alarm information is transmitted to the senders of jobs that were sent to the image forming apparatus 1 after the job with which the abnormality occurred (the shaded area in FIG. 7), i.e., to the senders of job-(n-4) to job-(n-6) in FIG. 7, for example. By transmitting the abnormality alarm information to the users who sent jobs to the image forming apparatus 1 after the job with which the abnormality occurred, each such user can be prompted to perform the operation required to eliminate the abnormality, which in turn will facilitate the execution of the user's own job. At the same time, the abnormality alarm information is also transmitted to the senders of jobs that were successfully executed within a certain period of time prior to the occurrence of the abnormality, i.e., to the senders of job-(n-2) to job-(n-1) in FIG. 7, for example. If their jobs were executed within a certain period of time prior to the occurrence of the abnormality, it is possible that such users have not left their stations for to the image forming apparatus 1 to retrieve their output materials, and in that case, such users can be requested to perform the operation required to eliminate the abnormality in addition to retrieving their output materials.

Naturally, the abnormality alarm information may be transmitted to the senders of all jobs remaining in the job list information, i.e., to the senders of job-N to job-(n-6) in FIG. 7, for example.

In this example, the abnormality alarm information is transmit ted to the senders of jobs that were successfully executed within a certain period of time prior to the occurrence of the abnormality, but where retrieval from the image forming apparatus 1 by the sender of the output material for a successfully executed job can be determined on the side of the image forming apparatus 1, the abnormality alarm information may be transmitted only to, among the senders of jobs completed within a certain period of time prior to the occurrence of the abnormality, the senders of the jobs for which the output materials still remain in the image forming apparatus 1.

Where the image forming apparatus 1 is an MFP (multi-function peripheral) having printer, facsimile and copying functions, it may be determined as attribute information whether or not the sender of a job can come to the image forming apparatus 1 to perform maintenance. In particular, where an abnormality such as a paper jam is detected during execution of a facsimile job, alarm information may be transmitted not to the sender of the facsimile but to persons in the vicinity of the MFP or to the senders of print jobs that are standing by.

Figure 2:
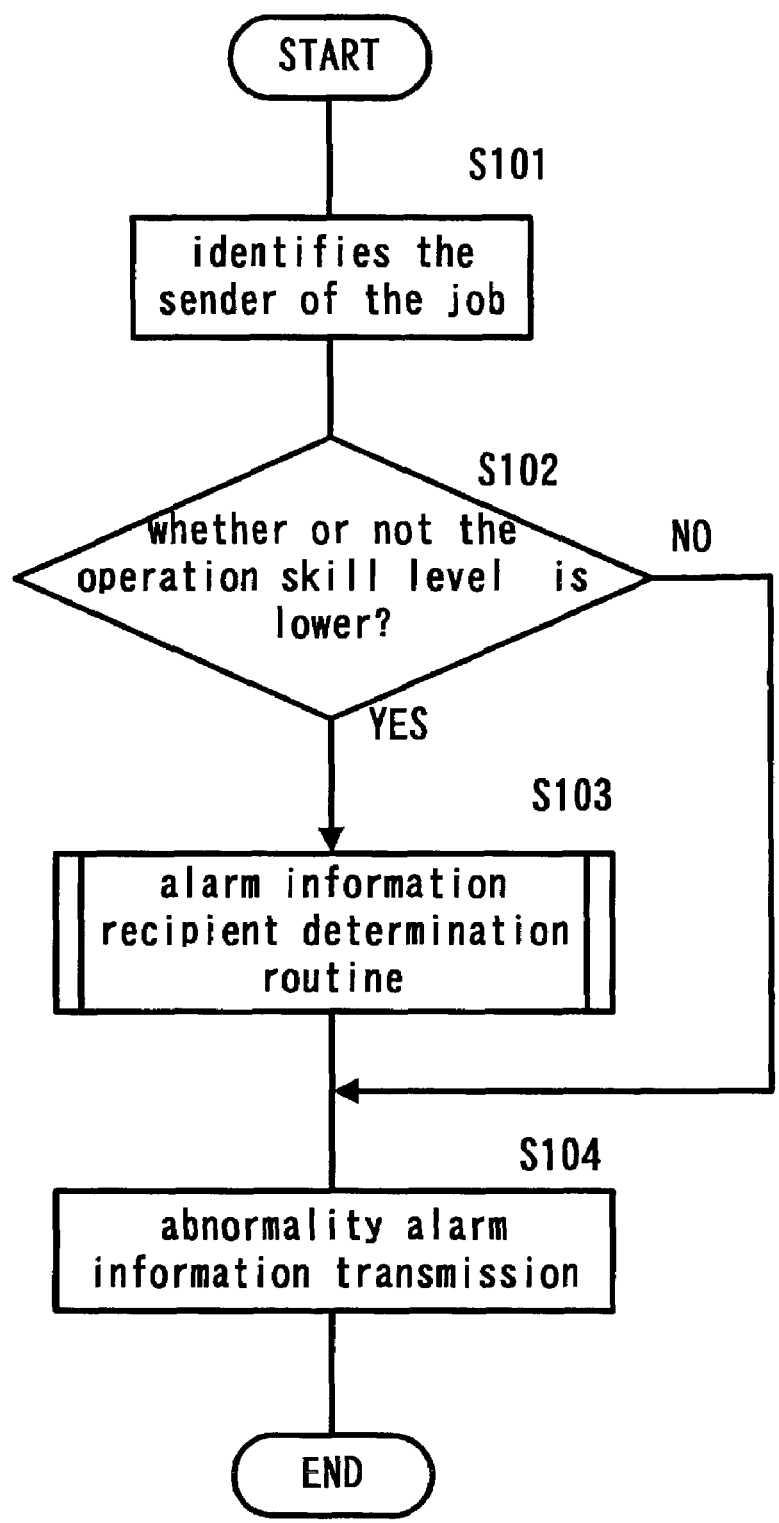
FIG. 2 is a flow chart showing the abnormality alarm information transmission routine performed by the abnormality alarm system.
Figure 3:
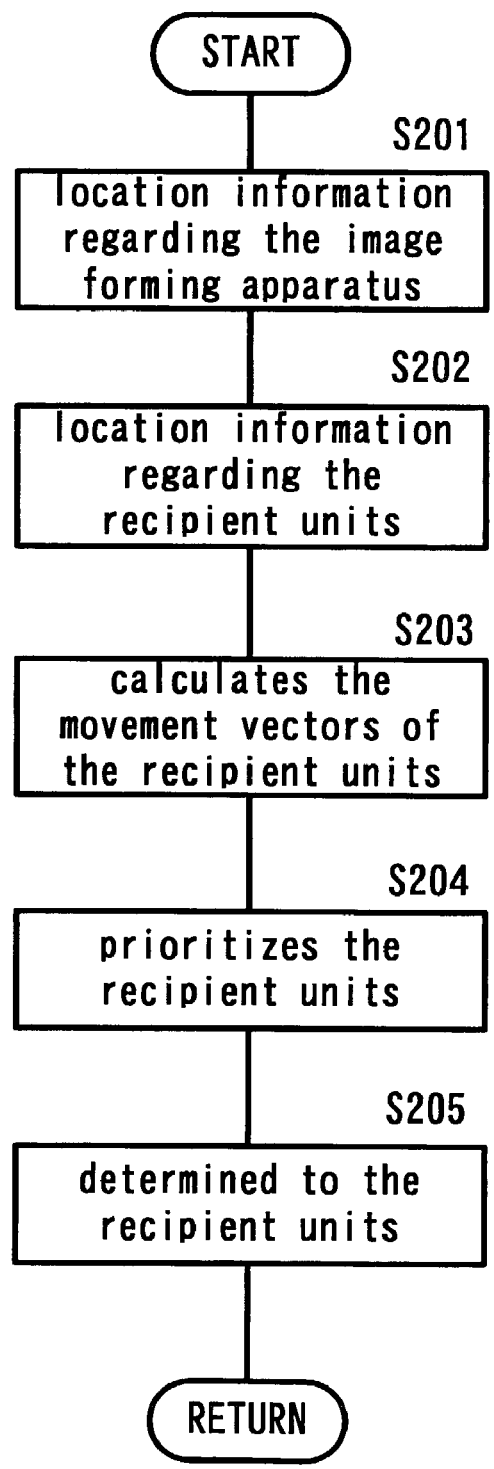
FIG. 3 is a flow chart showing the alarm information recipient determination routine (S103)
Figure 6:
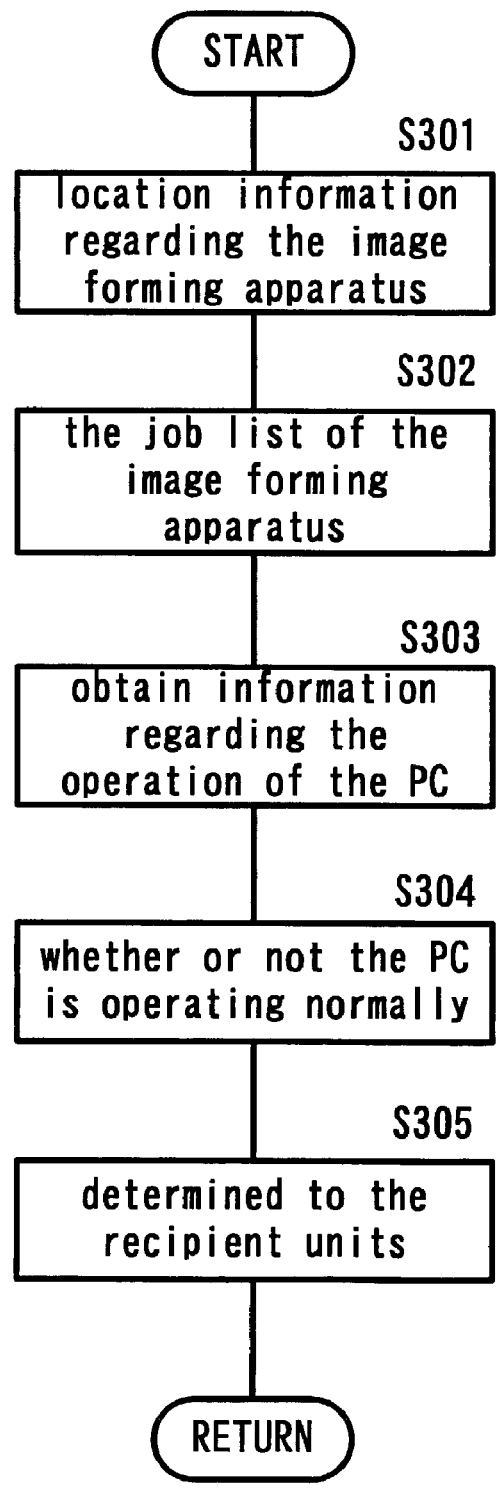
FIG. 6 is a flow chart showing another example of the alarm information recipient determination routine (S103)

The routines shown in FIGS. 2, 3 and 6 may be executed by the CPU in the abnormality alarm device based on a software program or using hardware circuits. The program described above may be provided in the form of a print driver or application software, or downloaded from the network.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

We claim:

1. An abnormality alarm system comprising:
    detecting means for detecting an abnormality in a job execution apparatus that executes jobs received from senders;
    storing means for storing (a) a user identifier corresponding to a sender of a job, and (b) a user attribute including information indicating whether the sender is a recipient user or a non-recipient user of abnormality alarm information;
    identifying means for identifying the user attribute of the sender of the job being executed when an abnormality occurred based on the stored information;
    alarm information recipient determining means for determining recipients of abnormality alarm information in accordance with the identification result obtained by said identifying means, wherein, when the user attribute indicates that the sender is a non-recipient user of abnormality alarm information, the alarm information recipient determining means determines at least one recipient other than the sender; and
    transmitting means for transmitting the abnormality alarm information to the at least one recipient thus determined.

2. The abnormality alarm system according to claim 1, wherein said attribute of the job sender relates to whether or not the job sender is capable of performing the operation required to eliminate the abnormality.

3. The abnormality alarm system according to claim 1, wherein said alarm information recipients are portable terminals, cellular phones or non-portable terminals.

4. The abnormality alarm system according to claim 3, wherein the determination of alarm information recipients by said alarm information recipient determining means is performed based on information regarding the movement of said portable terminals or cellular phones.

5. The abnormality alarm system according to claim 4, wherein the determination of alarm information recipients by said alarm information recipient determining means is performed based on information in accordance with the amount of time needed for them to reach the job execution apparatus.

6. The abnormality alarm system according to claim 3, wherein the determination of alarm information recipients by said alarm information recipient determining means is performed based on the status of operation of said non-portable terminals.

7. The abnormality alarm system according to claim 1, wherein said alarm information recipient determining means determines as alarm information recipients the senders of jobs that were sent to the job execution apparatus prior to the job with which said abnormality occurred.

8. An abnormality alarm device comprising:
a detection unit that detects an abnormality in a job execution apparatus that executes jobs received from senders;
a storing unit for storing (a) a user identifier corresponding to a sender of a job, and (b) a user attribute including information indicating whether the sender is a recipient user or a non-recipient user of abnormality alarm information;
an identification unit that identifies the sender of the job being executed when the abnormality occurred;
an alarm information recipient determination unit that determines recipients for abnormality alarm information in accordance with the identification result obtained by said identifying unit, wherein, when the sender is a member of a user group having an attribute corresponding to a non-recipient user of the abnormality alarm information, the alarm information recipient determination unit determines at least one recipient other than the sender; and
a transmission unit that transmits the abnormality alarm information to the recipients thus determined.

9. The abnormality alarm device according to claim 8, wherein said attribute of the job sender relates to whether or not the job sender is capable of performing the operation required to eliminate the abnormality.

10. The abnormality alarm device according to claim 8, wherein said alarm information recipients are portable terminals or cellular phones, and wherein the determination of alarm information recipients by said alarm information recipient determination unit is performed based on information regarding the movement of said portable terminals or cellular phones.

11. The abnormality alarm device according to claim 8, wherein the determination of alarm information recipients by said alarm information recipient determination unit is performed based on the status of operation of said alarm information recipients.

12. An image forming apparatus that performs printing based on print data transmitted from an external apparatus such as a personal computer or facsimile machine, comprising:
a printing unit that receives the print data sent from a sender and prints it on a recording medium;
a detection sensor that detects abnormalities in said printing unit;
a storing unit for storing (a) a user identifier for identifying a sender of print data, and (b) a user attribute including information indicating whether the sender is a recipient user or a non-recipient user of abnormality alarm information;
a controller that identifies, based on the stored information, an attribute of the sender of the print data associated with a detected abnormality and determines recipients of abnormality alarm information in accordance with the result of the identification; and
an alarm information transmission unit that transmits the abnormality alarm information to the recipients thus determined;
wherein the recipients of the abnormality alarm information comprise at least one recipient that is not the sender of the print data when the attribute of the sender of the print data is identified as a specific attribute.

13. The image forming apparatus according to claim 12, wherein said attribute of the print data sender relates to whether or not the job sender is capable of performing the operation required to eliminate the abnormality.

14. The image forming apparatus according to claim 12, wherein the determination of alarm information recipients by said controller is performed based on information regarding the movement of said portable terminals or cellular phones.

15. The image forming apparatus according to claim 12, wherein said controller determines as alarm information recipients the senders of jobs that were sent to the job execution apparatus prior to the job with which said abnormality occurred.

16. An abnormality alarm method comprising: p1 detecting an abnormality in a job execution apparatus that executes jobs received from senders;
reading out from a storage unit stored user information comprising a user attribute including information indicating whether a sender of a job is a recipient user or a non-recipient user of abnormality alarm information, and correspondence information identifying a user as the sender of the job;
identifying the user attribute corresponding to the sender of the job being executed when an abnormality occurred, based on the stored user information;
determining recipients for abnormality alarm information in accordance with the identification result, wherein, when the attribute of the sender of the job is identified as a specific attribute, at least one destination other than the sender of the job is to be determined to be a recipient of the abnormality alarm information in place of the sender of the job; and
transmitting the abnormality alarm information to the at least one recipient thus determined.

17. An image forming apparatus that performs printing based on print data transmitted from an external apparatus such as a personal computer or facsimile machine, comprising:
a printing unit that receives the print data sent from a sender and prints it on a recording medium;
a detection sensor that detects abnormalities in said printing unit;
a controller that identifies the sender of the print data associated with a detected abnormality and determines recipients of abnormality alarm information in accordance with the result of the identification; and an alarm information transmission unit that transmits the abnormality alarm information to the recipients thus determined;

wherein the recipients of the abnormality alarm information comprise at least one recipient that is not the sender of the print data when the sender of the print data is identified as a member of a user group having a specific attribute, and wherein the sender is distinguished by the specific attribute as a non-recipient user of abnormality alarm information.

18. An abnormality alarm method comprising:

detecting an abnormality in a job execution apparatus that executes jobs received from senders;

identifying the sender of the job being executed when an abnormality occurred;

determining recipients for abnormality alarm information in accordance with the identification result, wherein, when the sender of the job is identified as a member of a user group having a specific attribute, at least one destination other than the sender of the job is to be determined to be a recipient of the abnormality alarm information in place of the sender of the job; and transmitting the abnormality alarm information to the at least one recipients recipient thus determined;

wherein the user is distinguished by the specific attribute as a non-recipient of the abnormality alarm information.

* * * * *